May 24, 1960 H. SCHNELL ET AL 2,938,113

RADIO RECEIVING SET AND HOUSING THEREFOR

Filed March 12, 1957 2 Sheets-Sheet 1

May 24, 1960 H. SCHNELL ET AL 2,938,113

RADIO RECEIVING SET AND HOUSING THEREFOR

Filed March 12, 1957 2 Sheets-Sheet 2

United States Patent Office 2,938,113
Patented May 24, 1960

2,938,113

RADIO RECEIVING SET AND HOUSING THEREFOR

Heinrich Schnell, Wolfenbütteler Strasse 19, and Ferdinand Masuch, St. Ingbert Strasse 15, both of Braunschweig, Germany Filed Mar. 12, 1957, Ser. No. 645,423

Claims priority, application Germany Mar. 17, 1956

3 Claims. (Cl. 250—14)

The present invention relates to improvements in radio receivers, and more particularly to cabinets or housings for mounting radio sets and for completely hiding the same from view.

It is the principal object of the present invention to provide a new type of radio cabinet in the form of a hollow frame casing within which the various parts of a radio set may be mounted so that such set will be completely hidden from view, while the area surrounded by the hollow frame casing remains completely free of any parts of the radio set and may be used as a structural element for various purposes such as a window or door frame or the like, or for framing a picture or painting or a mirror or the like, in which case the frame may be provided with suitable means for suspending it on a wall.

Further objects, features, and advantages of the present invention will be apparent from the following detailed description thereof, particularly when read with reference to the accompanying drawings, in which—

Fig. 5 shows a perspective view of one corner of a frame similar to that shown in Fig. 4, but with a different kind of arrangement of the loudspeaker; while

Figure 1:
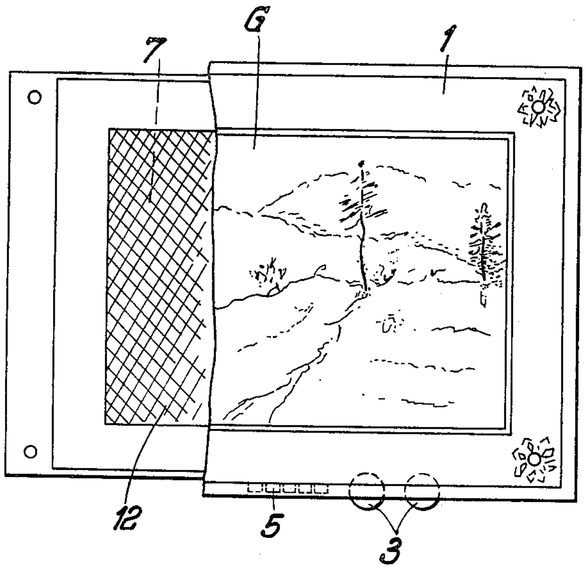
Fig. 1 shows the new arrangement of a radio set in the form of a frame for a painting, parts of which are broken away to show the loudspeaker of the radio set.
Figure 2:
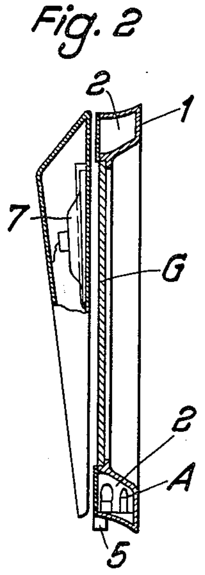
Fig. 2 shows a vertical cross section through the frame-like radio cabinet according to the invention with the radio set mounted therein and with a loudspeaker shown partly in section mounted in the area behind that which is surrounded by the frame.
Figure 3:
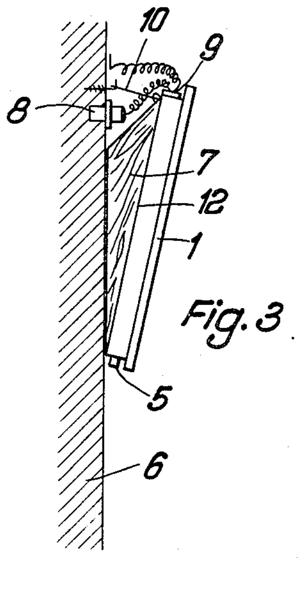
Fig. 3 shows a side view of a radio set similar to that as shown in Figs. 1 and 2 mounted on a wall.

Referring to the drawings, the device according to the invention consists of a hollow frame casing 1 of any desired size or shape and made of any suitable material. This frame casing 1 forms the housing of a radio receiver, the parts A of which are distributed in a suitable arrangement within the area of the hollow frame casing 1 so as to be hidden from the outside. The control elements with control knobs 5 for turning the radio on or off are preferably provided within the lower frame member and knobs 5 extend through the lower wall thereof. The volume control of the radio may be regulated, for example, by means of rotatable disks 3 projecting slightly below the lower wall of the frame. If desired, these disks 3, as well as knobs 5, may consist of Plexiglas or similar material so as to be less visible. Also, the frame may be shaped so that its front surface projects outwardly and thus hides disks 3 and knobs 5 completely from view. Since the parts of the radio set do not project into the area F surrounded by frame casing 1, the frame casing may be used for various purposes, such as a door or window frame, or, as illustrated in the drawings, as a frame for a picture or painting G. Since such paintings are usually suspended on a wall 6 in a slightly inclined position, the inclined area between wall 6 and the rear wall 12 of frame 1 may be utilized for mounting the loudspeaker 7 of the set by providing the same within a housing which is shaped in accordance with the inclined area. For connecting the radio set, an electric outlet 8 is preferably provided in wall 6 behind frame 1 and the connecting cable may lead to outlet 8 so as likewise to be hidden from view, as illustrated in Fig. 3. The frame may be secured to wall 6 by any suitable means, such as shown, for example, at 10 in Fig. 3.

If the frame is to be used as a door or window frame or the like, the central area F must remain unoccupied. In such case, the loudspeaker may either be mounted at some other point of the room or it must also be provided within the frame itself. This is illustrated, for example, in Fig. 4, in which frame **1*a* has a hollow space 2*a* at least within its frame members, and wherein the radio set itself is again mounted within the lower frame member, while a pair of loudspeakers 11 and 12 are mounted within the upper frame member. The antenna and ground connections 9 or 9*a* may be provided at the rear of frame 1 or 1*a*, respectively. However, as indicated in Fig. 4, a built-in antenna 14 may also be provided within the hollow space 2*a* of frame 1*a***.

Figure 4:
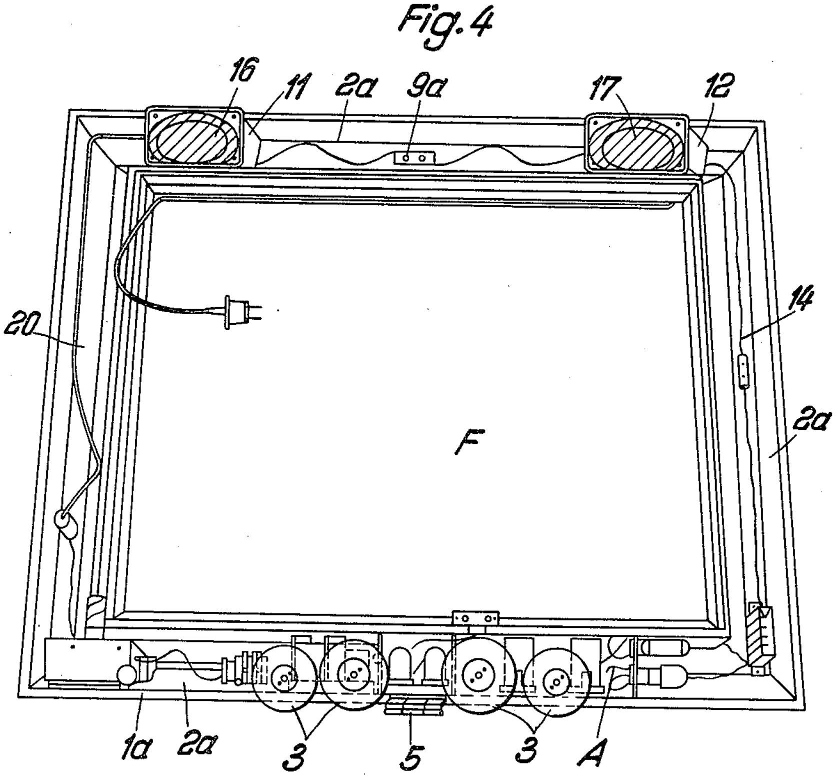
Fig. 4 shows a perspective view of the new radio set as seen from the rear of the frame with the rear wall thereof removed.
Figure 5:
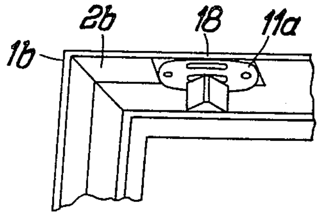
Figure 6:
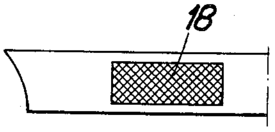
Fig. 6 shows a plan view of the loudspeaker arrangement according to Fig. 5.

If the frame is mounted in an inclined position, the sound openings 16 and 17 of loudspeakers 11 and 12 are preferably directed toward the rear of the frame, as shown in Fig. 4. If, however, the frame **1*b*, as shown in Figs. 5 and 6, is used, for example, for holding a mirror which has to hang parallel to the wall, the sound openings 18 of loudspeakers 11*a*** should also be directed parallel to the plane of the frame.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A radio receiving set comprising, in combination, a hollow frame casing having an inner peripheral face defining an unobstructed opening, radio receiving apparatus consisting of components mounted and confined within said hollow frame casing, said components disposed in said frame casing in such a manner as not to protrude into said unobstructed opening.

2. The radio receiving set according to claim 1, further provided with a loudspeaker mounted and confined within said hollow frame in such a manner as not to protrude into said unobstructed opening, and means confined in said casing, electronically connecting said receiving apparatus and said loudspeaker.

3. The radio receiving set according to claim 2, said set adapted for mounting a plate-like insert having an outer edge portion in said unobstructed opening, wherein said inner peripheral face of the casing is provided with a groove for receiving said insert's outer edge portion.

References Cited in the file of this patent

UNITED STATES PATENTS

| | | |
|---|---|---|
| 2,062,632 | Amdur | Jan. 27, 1936 |
| 2,293,612 | Montague | Aug. 18, 1942 |

FOREIGN PATENTS

| | | |
|---|---|---|
| 486,734 | Italy | Nov. 17, 1953 |

OTHER REFERENCES

Popular Science Monthly, August 1936, "Make a Picture Frame Radio," pp. 52, 53.